United States Patent [19]

Troeller et al.

[11] Patent Number: 5,768,445
[45] Date of Patent: Jun. 16, 1998

[54] COMPRESSION AND DECOMPRESSION SCHEME PERFORMED ON SHARED WORKSTATION MEMORY BY MEDIA COPROCESSOR

[75] Inventors: Mark W. Troeller, Visalia; Michael L. Fuccio, Sunnyvale; Henry P. Moreton, Oakland; Bent Hagemark, San Francisco; Te-Li Lau, Palo Alto, all of Calif.

[73] Assignee: Silicon Graphics, Inc., Mountain View, Calif.

[21] Appl. No.: 713,599

[22] Filed: Sep. 13, 1996

[51] Int. Cl.[6] .................................................. G06K 9/00
[52] U.S. Cl. ...................................... 382/305; 382/232
[58] Field of Search ................................ 382/232, 233,
382/234, 235, 236, 238, 239, 290, 244,
245, 246, 248, 250, 251, 276, 302, 303,
304, 305, 306, 309, 166, 307, 311; 348/645,
180; 711/100, 111, 112, 113, 114, 117,
120, 121, 122, 127, 128, 129, 130, 147,
153, 157, 165, 167, 168, 169, 170, 173,
211

[56] References Cited

U.S. PATENT DOCUMENTS 5,212,742   5/1993   Normile et al. .................... 382/56
5,373,327  12/1994   McGee et al. ..................... 348/645

FOREIGN PATENT DOCUMENTS 0 686 939 A1  12/1995  European Pat. Off. .......... G06T 1/20

WO 93 19431 A  9/1993  WIPO .......................... G06F 15/80
WO 94 10641 A  5/1994  WIPO .......................... G06F 15/62

OTHER PUBLICATIONS

Woobin Lee et al., "Real-Time MPEG Video Codec on a Signal-Chip Multiprocessor", Proceedings of the SPIE, vol. 2187, 1 Jan. 1994.

Bachstein W. et al., "Single-Chip Erledigt Multimedia" Elektronic, vol. 45, No. 17, 20 Aug. 1996 no page #.

"High-Speed Direct Memory Access Control Method", IBM Technical Disclosure Bulletin, vol. 33, No. 8, 1 Jan. 1991 no page #.

Onoye T. et al., "HDTV Level MPEG2 Video Decoder VLSI", 1995 IEEE Tencon., IEEE Region ten International Conference on Microelectronics and VLSI, Hong Kong, Nov. 6–10, 1995, 6 Nov. 1995, Intstitute of Electrical and Electronical Engineers no page #.

Primary Examiner—Leo H. Boudreau
Assistant Examiner—Bijan Tadayon
Attorney, Agent, or Firm—Wagner, Murabito & Hao

[57] ABSTRACT

This relates to a general purpose circuit that maximizes the computing power of a Unix workstation or other computer system for processing image or other data in accordance with a selected one or ones of several alternative compression and decompression algorithms. This dynamically allocates system memory for storage of both compressed and uncompressed data and ensures adequate compression and decompression rates.

15 Claims, 5 Drawing Sheets

COMPRESSION AND DECOMPRESSION SCHEME PERFORMED ON SHARED WORKSTATION MEMORY BY MEDIA COPROCESSOR

TECHNICAL FIELD

The present invention relates to data compression and decompression and more particularly, to compression and decompression of digital information in a real-time computer system environment.

BACKGROUND ART

In computer systems, large amounts of data, such as operating systems application programs, graphical and video information in digital form must be stored or manipulated. To reduce the bandwidth required to transfer the data and storage requirements, the data is often compressed. Before the computer system may operate on compressed data, it must be decompressed. Since most operating system and application data is relatively static, rates of compression and decompression are not critical. However, since graphical and video image data is generated and/or displayed in real-time and since such data is generated in voluminous quantities, performance requirements are higher.

As picture telephony technology is implemented in conjunction with the internet or other computer based networks, the demand to compress and transmit image data in real-time will increase. However, not only will such image data need to be compressed, it is also desirable to permit the computer system to enhance or manipulate image data concurrently with the compression or decompression process. Such enhancement may include addition of time and date information, blending, add overlays or some other programmable function.

Image data, which may include audio information, may be generated by video cameras or other known devices as a stream of bits, or bit stream. Image data is generated in real-time and is transferred from one device to another in the computer system or over a network. Due to the large amounts of data associated with image data, compression systems, such as JPEG, MPEG, M-JPEG, H.261 and others, have been adopted to define methods of compressing the bit stream. As is well known, compression systems are implemented because some devices, such as fixed disks, CD-ROM drives, as well as most network protocols require compressed video image data before delivering or accepting a real-time video stream.

Compression systems reduce spatial and temporal redundancy in a sequence of pictures. Most standard compression systems work on individual blocks of data so the tokens corresponding to patterns in one block may differ from the tokens of another block. This variability creates complexity in coding and decoding the data. Further, the variability makes it difficult to design a single hardware embodiment capable of coding and decoding the different algorithms used by the various compression systems.

Accordingly, it is common for a computer system to include more than one hardware and/or software compression systems. Further, the variability requires that the various components of the image capture and display system be compatible so as to prevent creation of artifacts or inclusion of other visible errors into the image.

One method that avoids many of the problems associated with hardware compression is known as software compression. Software compression systems operate as a software driver that intercepts the bit stream coming from, for example, an image source, such as a camera or CD-ROM, stores the data in system memory and invokes the system's central processor (CPU) to compress the data before sending it to a destination device, such as the disk drive. When the data is later accessed, the software engine must first transfer the compressed data to memory and, using the CPU, run a decompression algorithm on the data before it may be displayed or otherwise manipulated by the CPU. One advantage of software compression/decompression is that there is complete versatility as to the selection of the appropriate compression or decompression algorithm. However, as is well known in the art, software compression systems are slow and tend to consume large amounts of the central processor's computational time. Indeed, the demands of some compression algorithms are so great, most MPEG software compression drivers are unable to compress full size video images in real time.

Hardware compression engines are common and are available as board level devices. For example, U.S. Pat. No. 5,357,614 which issued on Oct. 18, 1994 and entitled DATA COMPRESSION CONTROLLER discloses a compression engine that compresses/decompresses data as it is transferred to or from a storage device such as a tape drive. This compression engine uses a proprietary compression algorithm and is not capable of decompressing data compressed according to other standards. As is typical with such compression engines, the board must also include expensive local memory, a local processor and/or control and interface logic.

Many image generating devices, such as video cameras, are provided with a resident compression engine so the output of the bit stream is compressed before it is transferred to a display device, which must be provided with a complementary decompression engine, or directly to storage. As will be readily appreciated, if the hardware engine resident on the video camera is not compatible with the display device, it will be unnecessarily expensive. As will be further appreciated, replicating compression and decompression engines among the peripherals is expensive and unnecessarily redundant since each device must include its own engine and associated memory and control logic, especially if multiple compression algorithms must be supported.

Another significant problem with image generating devices having resident compression is that the compressed data losses its character as image data. This loss of character prevents the CPU from operating or processing the data in real-time. By way of example, if data is compressed before it is stored in system memory, it is difficult to add time stamps or index markers to selected image frames or eliminate redundant images before storing to a storage device.

Alternatively, some computer systems include a compression coprocessor as a compromise between pure software compression systems and dedicated hardware compression systems. Such coprocessors perform the compression and decompression algorithms otherwise run by the CPU. However, such coprocessors generally require substantial amounts of dedicated memory for storing the uncompressed data. Indeed it is common for such coprocessors to have up to 4 Mbytes of fast and expensive dedicated memory. If the coprocessor does not have adequate memory available, it is possible that the coprocessor may not be able to properly compress or decompress images in accordance with many available algorithms. As will be readily appreciated, providing substantial dedicated memory in the coprocessor, which may be sparingly utilized, will increase system cost. Further, if the CPU must process image data in some manner, such as, by way of example, adding overlays, changing shadings or perform color space conversion, there will be unnecessary data transfers between system memory and the coprocessor's memory which may unnecessarily increase the load on the system's bus and the throughput rate.

What is required is a system that compresses video and image data that is independent from the requirements of the image capture device or the display device. What is also required is a system that provides the processing power to manipulate billions of arithmetic operations per second across a wide range of real world applications so that the image data may be manipulated before it is compressed and stored (or transmitted over a network) or decompressed and displayed.

SUMMARY OF THE INVENTION

The preceding and other shortcomings of the prior art systems are addressed and overcome by the present invention. The present invention relates to a general purpose circuit that maximizes the computing power of a Unix workstation or other computer system for processing image data in real-time while providing the ability to compress or decompress the image data. The present invention dynamically allocates system memory for storage of both compressed and uncompressed data and ensures adequate compression and decompression rates.

The circuit of the present invention converts between various image protocols, color space and different signal domains such as frequency and time with little impact on system performance. The performance requirements of such operations are provided by a novel design that enhances the flow of data through the computer system without requiring significant processing resources from the central CPU. Thus, new and existing image processing tasks are provided without adding memory circuit elements dedicated to such tasks. Further, the resources of the present invention may be shared across multiple software applications such as texture generation, data compression or other image processing functions since image data may be readily processed in system memory.

The present invention manipulates video and image data in system memory with a video, imaging and compression (VIC) engine that consists of a DMA (direct memory access) controller to move data to and from system memory to the VIC engine, a media signal processor that performs integer, logical and mathematical operations necessary for signal processing and a bit stream processor optimized to perform variable bit length processing common in compression and de-compression algorithms. The combination of using the workstation memory for storage of image data and the VIC engine is very powerful and versatile in that image data can be stored, retrieved, and manipulated by the CPU as opposed to prior art computer systems than merely record and display image data in a manner that emulates a television or a photograph. Specifically, since the VIC engine off-loads the compression or decompression tasks, the workstation is capable of over an additional billion instructions per second for general purpose pixel manipulation. Accordingly, the present invention permits a wide range of flexibility in processing data without the addition of expensive multiple dedicated coprocessors or add-on peripherals such as rendering and blending or video capture, and display devices. Further, the workstation and its available memory is flexible enough to support many compression and decompression algorithms regardless of memory requirements.

The present invention advantageously uses the large bandwidth system bus of the workstation for transferring image data to or from system memory which serves as a frame buffer, a Z buffer or texture memory and permits economical sharing of low-level functional elements, such as the arithmetic block, logical block, and control flow block of the VIC engine, among many peripherals and processes involving multiple memory-to-memory activities that may not necessarily involve a peripheral.

Another advantage of the present invention is that the CPU may manipulate the image data before it is compressed by the VIC engine. When it is desired to display the compressed stored data, the data is transferred from the storage device to system memory and made available to the VIC engine. Under control of the DMA controller, data is transferred to the VIC engine, decompressed and transferred back to system memory where the CPU may further process the data before it is sent to the display device.

Using the shared system memory to implement the VIC engine functions requires that dedicated areas of system memory be mapped for use by the VIC engine so as to prevent other areas of system memory from being overwritten by the VIC engine. Memory mapping in the preferred embodiment is controlled by the host CPU and dynamically programmed into a table memory provided in the VIC engine. While it is desirable to provide up to 4 Mbytes of system memory for use by the VIC engine, the system memory need not be contiguous.

Accordingly, the present invention provides a system that permits the manipulation of video and image data rather than just displaying image data in a manner that merely emulates a television or photographs. The present invention frees up the workstation to sort or manipulate image data, to perform content recognition, as well as to compress or decompress the image data in real-time.

The foregoing and additional features and advantages of this invention will become further apparent from the detailed description and accompanying drawing figures that follow.

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention. Wherever possible, the same reference numbers will be used throughout the drawings to refer to the same or like parts.

Figure 1:
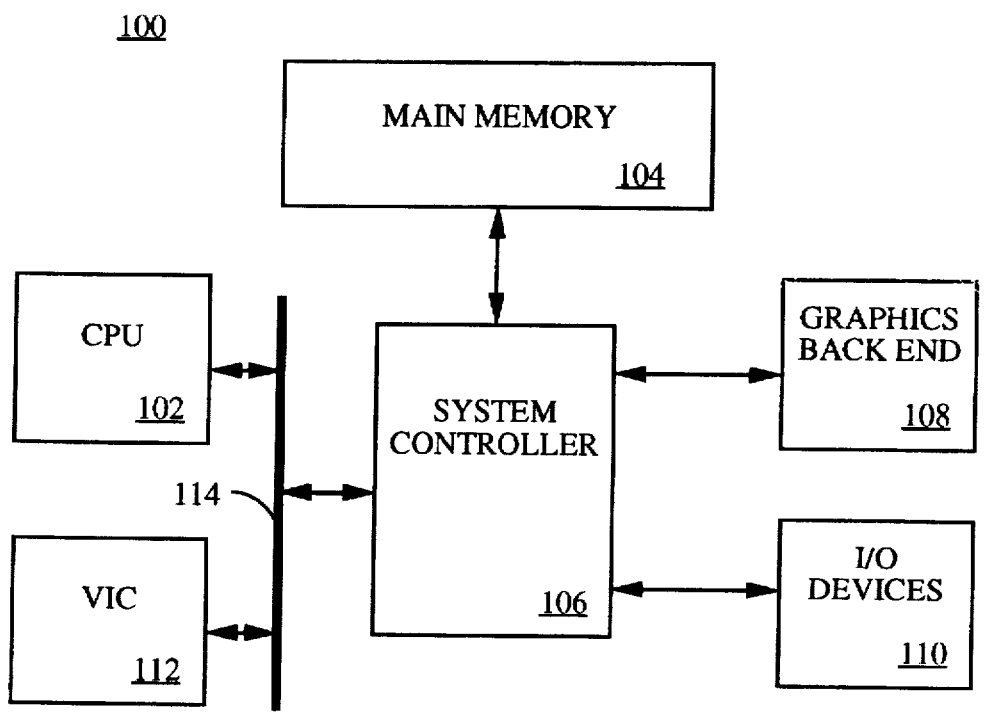
FIG. 1 illustrates a simplified block diagram of one embodiment of the present invention.

Referring to the drawings more particularly by reference numbers, FIG. 1 shows a preferred embodiment of a computer system 100 of the present invention having a central processing unit (CPU) 102, system memory 104 which is preferably a block of between 64 megabytes and one gigabyte of high speed RAM, a system controller 106 that controls transfer of data and instructions between CPU 102, system memory 104 and a plurality of peripherals such as a graphics display, a disk drive and other input/output (I/O) devices (not shown). Graphics interface 108 couples system controller 106 to a write-only display device while I/O interface 110 couples system controller 106 to a plurality of SCSI, Ethernet, PCI, video or audio peripherals such as a video capture card or a CD-ROM. In addition, computer system 100 also includes a video, imaging and compression (VIC) engine 112 that is coupled to both CPU 102 and system controller 106 by a high speed system bus 114.

Figure 2:
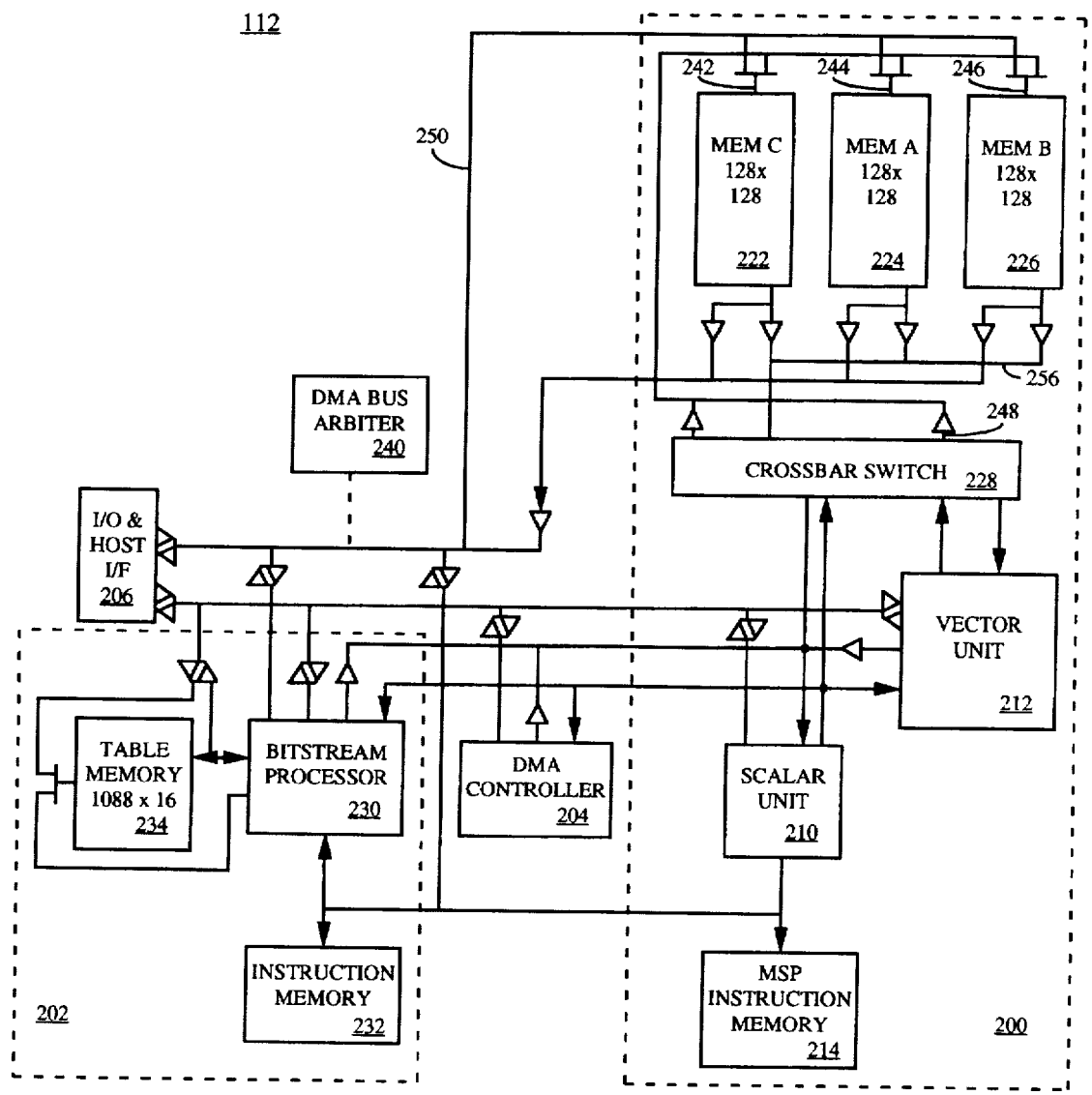
FIG. 2 illustrates a simplified block diagram of one embodiment of the video, imaging and compression (VIC) engine.

VIC engine 112, shown in greater detail in FIG. 2, contains four major functional blocks. Specifically, a media signal processor 200, a bit stream processor circuit 202, a DMA controller 204 and a host interface 206. Processors 200 and 202, together with the controller 204 and the interface 206 accelerate standard compression and de-compression algorithms.

In accordance with one aspect of the invention, video or image data from an input device such as a video camera or a CD-ROM ( or any other uncompressed data) is transferred to a portion of system memory 104. Subsequently, VIC engine 112 may initiate a block transfer using dedicated DMA controller 204 to transfer the data from system memory 104 to one of the three dedicated memories 222–226. The VIC engine compresses the data and stores compressed data to a second of the three memories 222–226. While data in the first memory is being compressed, additional data may be transferred to a third of the three memories. Upon completion of the compression operation, the data in the second of the memories is transferred back to a different portion of system memory 104 by the DMA controller 204. The compressed data may then be transferred from system memory 204 to a disk or other storage device (not shown). Compression on data in the third memory is then initiated with compressed data being stored in the first memory. The DMA controller 204 concurrently transfers data to the second of the memories. This process is continued until all data in system memory is compressed. Advantageously, the CPU may manipulate the image data before it is compressed by VIC engine 112.

When it is desired to display or further process the compressed data, the data is transferred from the storage device to system memory and made available to VIC engine 112. Under DMA control, data is transferred to one of the memories 222–226, decompressed and transferred back to system memory where the CPU may process the data before transfer to the display or other peripheral device.

VIC engine 112 may operate either as a slave on system bus 114 responding to bus transactions initiated by either CPU 102 or system controller 106 or as a bus master. VIC engine 112 may also request mastership of system bus 114 for performing pipelined writes and reads or DMA transfers to or from system memory 104.

In one preferred embodiment, media signal processor 200 is an implementation of prior art Silicon Graphics MSP architecture that performs cosine transformation on visible pixels where YCrCb value is converted into the frequency domain. Media signal processor 200 includes a scalar unit processor 21 and a vector unit processor 212 both of which operate at 66 Mhz. Scalar unit processor 210 and vector unit processor 212 are coupled to a common 4K-byte instruction memory 214 by a 64-bit wide bus 216.

Scalar unit processor 210 performs control flow operations (such as jump and branch instructions), scalar integer arithmetic operations, logical operations and local memory load and stores. Scalar unit processor 210 is coupled by a three state bus 211 to vector unit processor 212, host interface 206, DMA controller 204 and bit stream processor circuit 202. Scalar unit processor is also coupled to memories 222, 224 and 226 by a 128-bit wide data path 213 and output path 215 via crossbar switch 228. Crossbar switch 228 permits a one-to-one connection between processors 210 and 212 and memories 222–226 ensuring minimal capacitance bus loading.

Vector unit processor 212 is a single instruction multiple data (SIMD) processor that performs math operations and particularly, performs the cosine transformation so that visible pixels, having a YCrCb value, are converted to the frequency domain for compression or from the frequency domain to the spatial domain for decompression. Vector unit processor 212 is coupled to memories 222, 224 and 226 by an internal, 128-bit wide data path 218 and output path 220 via crossbar switch 228. Data paths 218 and 220 may be sliced in eight sixteen bit segments for the purpose of performing integer mathematical operations. No branch instructions are included in the instruction set of vector unit processor 212 as such functions are performed by scalar processing unit 210.

Bit stream processor circuit 202 is a programmable device tailored for processing bit streams of compressed data. It is capable of performing entropy encoding which requires variable length lookups for compression algorithms as well as handling additional protocol, such as bit stuffing, header and preamble generation, etc., as may be required by a particular compression standard. Bit stream processor 230 is preferably a RISC core with a load and store architecture. It has an instruction set stored in instruction memory 232 comprising register to register operations (i.e., arithmetic operations), instruction stream control (i.e., jumps and branches) and memory to register transfer of data. In addition, bit stream processor 230 has instructions that are specific to manipulating arbitrarily aligned "tokens" or artifacts of the compression process, in a bit stream of data. Further still, bit stream processor 230 has instructions that can perform table lookup operations necessary to decode variable length tokens in a bit stream. The lookup tables are stored in table memory 234 and are programmable to support MPEG-1, MPEG-2, H.261, JPEG or proprietary algorithms. The lookup tables are further programmable by CPU 102 to dynamically map areas of system memory 104 available for use as a frame buffer.

DMA controller 204 provides flexible address generation so that VIC engine 112 can access regions of system memory 104 to acquire blocks of data that need to be either compressed or decompressed. DMA controller 204 consists of two DMA channels that either media signal processor 200 or bit stream processor circuit 202 or CPU 102 may access. Each channel consists of a DMA state machine, control registers, and a descriptor memory. Descriptors are used to define starting addresses of DMA controller 204 and further define the mode (i.e. Read/Write or Y/C split) and span and stride settings.

DMA controller 204 may be used to fill system memory 104 with data from the VIC engine 112 or to transfer data from system memory 104 to memory 214, 222–226 and/or 232. For DMA transactions to or from system memory 104, DMA controller 204 decomposes descriptor requests into a respective physical UNIX system memory address and byte count. A lookup table in table memory 234 converts between contiguous memory address space of the media signal processor instruction memory 214, the bit stream processor circuit instruction memory 232 and the corresponding memory address space of system memory 104.

System memory 104 appears to VIC engine 112 as a region of four megabytes of contiguous addressable memory space allocated for use by the processors 200 and 202. This allocated system memory is grouped in physically contiguous 64K byte blocks. These blocks can be located anywhere in system memory 104. The lookup table maps the location requested in the 4 megabyte region (as seen by VIC engine 112) into system memory into one of 64 different 64K byte pages of physical system memory 104. As part of the lookup table, there are bits to see if the VIC engine 112 is allowed to write to a selected block as well as bits to see if that block is mapped. VIC engine 112 can interrupt CPU 102 and halt if a write violation occurs or a block is not mapped to protect system memory 104 from corruption.

The lookup table can be re-programmed by CPU 102 as tasks assigned to VIC engine 112 change. This feature allows different 64K blocks of system memory 104 to be mapped into the VIC engine 112 viewport containing the lookup table without actually moving any data in system memory 104. This feature is useful for quickly switching between processes on computer system 100 that wish to share the VIC engine resource. As one skilled in the art will appreciate, if a local dedicated memory connected to the VIC engine were in use, it would most likely need to be saved and restored for each process switch.

Host interface 206 couples VIC engine 112 with the 64-bit system processor bus 114 of computer system 100. DMA arbiter 240 performs arbitration to allow VIC engine 112 to initiate transactions on system bus 114 without any intermediary overhead. Further, VIC engine 112 is able to respond as a slave to system processor bus 114 transactions or to request control of the system processor bus 114 to perform block pipelined writes and reads.

In accordance with another aspect of the invention, data is transferred to system memory 104 where CPU 102 may manipulate the data under control of an application program before the data is transferred to one of memories 222-226. VIC engine 112 compresses the transferred data in accordance with a selected compression standard (i.e., JPEG, MPEG, M-JPEG, H.261, etc.). Specifically, VIC engine 112 operates on the data loaded in a first of the three memories, encoded data is stored in the second memory, while the next frame of data is being loaded into the third of the three memories 222-226. After compression, the encoded data is transferred from VIC engine 112 to system memory 104 where CPU may concatenate the compressed data with index tags or other information that will assist in future sorting of the compressed images. As will be appreciated one skilled in the art, the compressed data may be retained in local storage device or transferred across a network.

When compressed data is to be recovered, the data is first loaded into system memory 104 where CPU 102 may manipulate or process the compressed images. The compressed data is transferred to memories 222-226 by DMA controller 204. DMA controller 204 is also responsible for transferring data to the VIC engine 112 for the operation of the appropriate decompression algorithm. DMA controller 204 is further responsible for transferring the uncompressed data to system memory 104. Advantageously, CPU may further manipulate the image before routing the image to the display device.

In the preferred embodiment, memories 222-226 comprise about 6K bytes of static RAM with each memory having 128 by 128 bits. Memories 222-226 are dual port memory blocks with access controlled by ports 242, 244 and 246, respectively. Vector unit processor 212 and scalar unit processor 210 have deterministic access to memories 222-226 that is guaranteed by DMA arbiter 240 and buses 248 and 256. Host interface 206, bit stream processor circuit 202 and DMA controller 204 access memories 222-226 over DMA bus 250.

As is well known in the art, JPEG compression is a standardized image compression mechanism for the archival and transmission of still images such as digitized photographs, graphs, etc. JPEG compression can achieve compression ratios ranging from, for example, 4:1 to 20:1 for a full color photograph so an image consisting of 2 Mbytes of data may be compressed to about 100 Kbytes.

Figure 3:
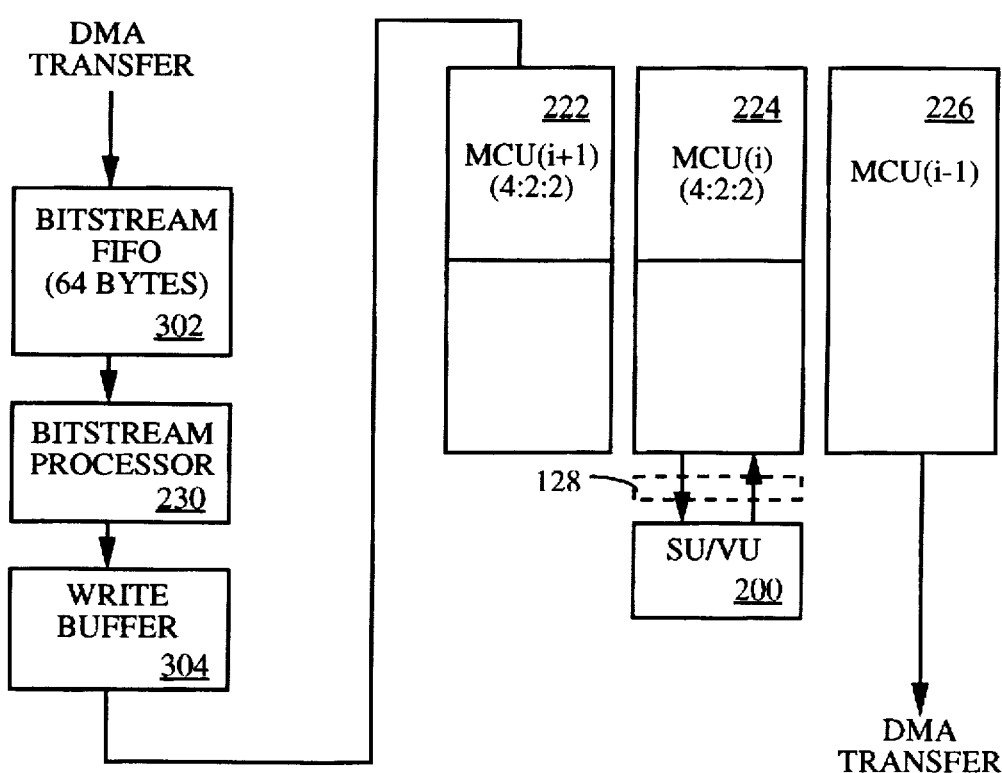
FIG. 3 illustrates on-chip memory allocation for decoding data in accordance with a known decompression algorithm.

Referring now to FIG. 3, data flow through VIC engine 112 is depicted, by way of example, for decoding JPEG images. Specifically, an instruction sequence for implementing an algorithm for JPEG compression or decompression is loaded into memories 214 and 232 (which are shown in FIG. 2). When a still image loaded into memory 104 is to be decompressed, a minimum coded unit comprising a level of granularity that is determined by the picture size, picture generation rate and the cycle time available for processing the unit of granularity is transferred by DMA controller 204 to a first in, first out (FIFO) 302. For the case of JPEG decoding or encoding, data is transferred at the minimum coded unit level where a minimum coded unit comprises 256-bytes. For the case of MPEG-2 decoding, data is transferred in macroblocks where a macroblock comprises 128-bytes. DMA controller 204 transfers data to FIFO 302 associated with bit stream processor circuit 202 64-bytes at a time. DMA bus arbiter 240 arbitrates between bus contentions for accessing system memory 104 and responding to bit stream processor circuit 202 requirements.

FIFO buffer 302 is a 64-byte buffer that is emptied by bit stream processor 230 32-bits at a time. Bit stream processor 230 is used to detect "markers" in compressed bit streams. These markers identify variable length coded segments within the compressed bit streams. Bit stream processor 230 can decode these variable length coded segments to reconstruct 8×8 blocks of discrete cosine transform (DCT) coefficients which are further processed by scalar unit processor 210 and vector unit processor 212. Bit stream processor 230 performance is driven by both the number of bits to be decoded as well as the number of tokens. DMA controller 204 stores decompressed data from a write buffer 304 in memory 222 before performing a block transfer to system memory 104.

During the decode process, bit stream processor 230 decodes the bitstream corresponding to an i-th+1 minimum coded unit and loads the decoded bitstream into write buffer 304. Write buffer 304 comprises an intermediate 4-byte register from which the decoded bitstream is transferred to memory 222 under control of DMA controller 204. While bit stream processor 230 is processing the i-th+1 minimum coded unit, the i-th minimum coded unit, which stored in memory 224, is available for processing by media signal processor 200. Media signal processor 200 must have deterministic access to the data in memory 224 so its memory access is accorded the highest priority. Results of the i-th−1 minimum coded unit decoded by the media signal processor are stored to memory 226 and transferred by DMA controller to system memory 104. It is possible, in alternative embodiments, for the decoded i-th−1 minimum coded unit to be stored in an unused portion of memory 222 when using the JPEG algorithm.

Figure 4:
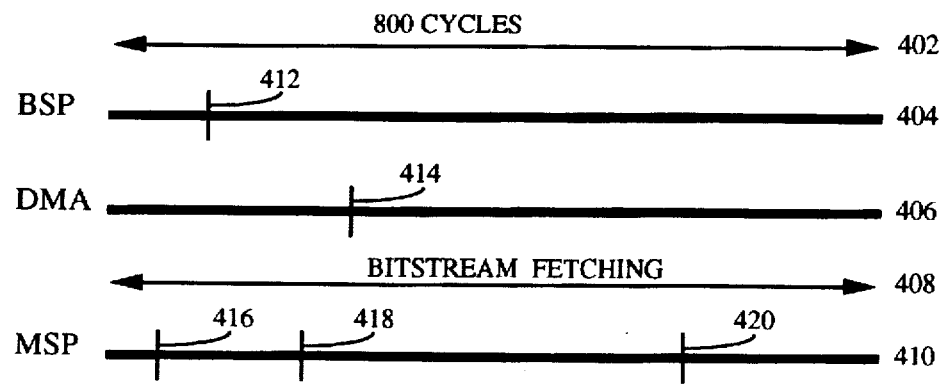
FIG. 4 represents a timing chart showing the concurrent operation of the processors of the VIC engine in a decode operation.

The decode registration diagram of FIG. 4 shows the process for 4:2:2 level decoding of a JPEG bitstream. The decode cycle duration in the preferred embodiment is 800 cycles, as shown at 402. During the decode cycle: 1) DMA controller 204 transfers data to or from system memory 104 as generally shown at 406; 2) media signal processor 200 decodes the i-th macroblock as shown at 410; and 3) bit stream processor circuit 202 works on conditioning the i-th+1 minimum coded unit, as shown at 404. Specifically, with this scheme, bit stream processor circuit 202 begins the process by decoding the minimum coded unit's header information, as indicated at 412. Meanwhile, DMA controller 204 first zeros out i-th+1 memory 222, as shown at 414, and transfers the i-th−1 minimum coded unit to system memory 104, as shown at 416.

As required, DMA controller 204 also responds to the bit stream processor's data requirements, as shown at 408 while bit stream processor decodes the compressed minimum coded units of data. As shown at 416, media signal processor 200 updates the decode information, such as Q matrix information. Media signal processor 200 then performs an inverse quantization of the data in memory 224, as indicated at 418. Upon completion, media signal processor 200 then performs the inverse discrete transform of the data and stores the result in memory 226. Memories 222–226 and parallel operation of DMA controller 204 with bit stream processor circuit 202 and media signal processor 200 compensate for the latency of the system memory. The parallel operation of bit stream processor circuit 202 and media signal processor 200 apply multi-tasking to the computational and decision making tasks so as to accomplish the compression or decompression process with relatively inexpensive processors operating at relatively slow 66 MHertz clock rates. Advantageously, the decode operation is completed with minimum memory requirement for memories 222–226 in a manner that compensates for any latency associated with obtaining data from system memory 104. In this manner, data will always be available for processing by scalar and/or vector units 210 and 212 of media signal processor 200.

Figure 6:
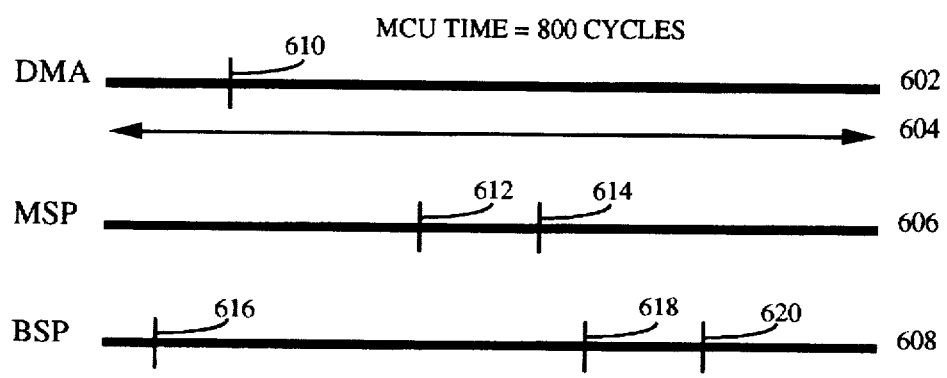
FIG. 6 represents a timing chart showing the concurrent operation of the processors of the VIC engine in an encoding operation.
Figure 5:
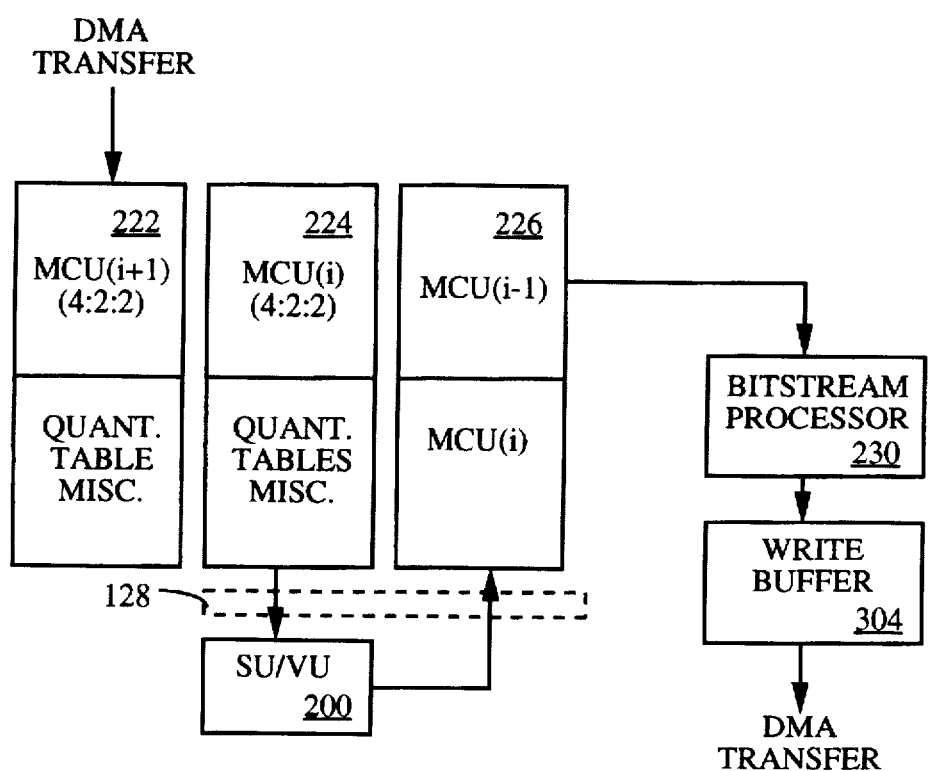
FIG. 5 illustrates memory allocation for encoding data in accordance with a known compression algorithm.

Encoding of JPEG data is described in conjunction with FIGS. 5 and 6 where DMA controller 204 loads a portion of memory 222 with the i-th+1 4:2:2 macro control block and a corresponding quantization table. While memory 222 is being loaded, media signal processor 200 performs quantization and a discrete cosine transform on four 8×8 blocks of data and saves the results in memory 226. Concurrently, bit stream processor circuit 202 Huffman codes the i-th−1 data in memory 226 and writes the result to write buffer 304. DMA controller 204 then transfers the compressed data from write buffer 304 to system memory 104.

As shown in FIG. 6, DMA controller 204 loads the i-th+1 macro control block at 610 when it is not attending to requests from write buffer 304, as indicated at 604. Media signal processor 200 performs the discrete cosine transform on the i-th macro control block up to 612. Thereafter, media signal processor 200 performs quantization transform on the i-th macro control block and transfers the result to memory 226, as indicated at 614. Concurrently, bit stream processor circuit 202 is performing Huffman coding and bitstream packing on the data in memory 226. Under ideal conditions, such operations will be completed as indicated at 618. However, since media signal processor 200 has priority access to memories 222–226, the time to complete the bit stream processor circuit's operation will most likely need to be de-rated, as indicated at 620, due to memory contention.

With respect to other compression algorithms, it is known in the art that MPEG (MPEG-1 and MPEG-2) is a recognized standard for compressing image and audio portions of moving pictures. MPEG adds adaptive quantization at the minimum coded unit (16×16 pixel area) layer. However, it is difficult to edit MPEG sequence on a frame-by-frame basis since each frame is intimately tied to the ones around it. Accordingly, in a minimum coded unit encode or decode application, data is first loaded, by way of example, in memory 222 as well as a backward predictor and a forward predictor. Memory 224 is used to for the resultant decoded or encoded data while the next frame of data is loaded by DMA controller 204 into memory 226.

One skilled in the art will appreciate that the versatility afforded by the architecture of VIC engine 112 affords the computational power to compress or decompress data in accordance with many known compression or decompression algorithms. Since data is initially routed to system memory, the VIC engine 112 does not require substantial dedicated memory since it needs only operate at a rate sufficient to minimize the amount of system memory 104 consumed. In the preferred embodiment, about 4 Mbytes of system memory 104 is allocated for up to six frames of uncompressed image data assuming a 640×480 pixel display. Additional system memory 104 is allocated for the compressed image data which in the worst case may amount to about 160 Kbytes for each frame, assuming a lightly compressed rate of 4:1. Higher compression rates would accordingly reduce memory requirements.

While certain exemplary preferred embodiments have been described and shown in the accompanying drawings, it is to be understood that such embodiments are merely illustrative of and not restrictive on the broad invention. Further, it is to be understood that this invention shall not be limited to the specific construction and arrangements shown and described since various modifications or changes may occur to those of ordinary skill in the art without departing from the spirit and scope of the invention as claimed.

We claim:

1. In a computer system having system memory, a system controller for controlling access to system memory, and a central processor for manipulating data stored in said system memory, a compression and decompression engine for compressing and decompressing data stored in said system memory, said compression and decompression engine comprising:

a first processor for performing cosine transformation on a YCrCb value representing visible pixels into the frequency domain, said central processor adapted to configure said first processor to compress or decompress said data in accordance with a selected compression or decompression algorithm;

a second processor for entropy encoding or decoding a bit stream of frequency domain data, said central processor adapted to configure said second processor to compress or decompress said data in accordance with said selected compression or decompression algorithm;

memory, associated with said first and second processors, said memory divided into at least three independently addressable memory banks; and a dynamic memory allocation (DMA) controller associated with said first and second processors, for transferring said data between system memory and said memory; wherein said DMA controller is adapted to transfer a first portion of said data from said system memory to a first of said at least three independently addressable memory banks to initiate a compression or decompression of said data, said DMA controller further adapted to transfer data to a second of said at least three independently addressable memory banks while said first and second processors compress or decompress said data in said first of said at least three independently addressable memory banks, said DMA controller further adapted to transfer compressed or decompressed data in a third of said at least three independently addressable memory banks to said system memory.

2. The compression and decompression engine of claim 1 wherein said DMA controller further comprises:

means for acquiring mastership of a system bus and transferring a unit of granularity of data to one of said at least three independently addressable memory banks.

3. The compression and decompression engine of claim 1 further comprising:

arbiter means and bus means for ensuring said first processor has highest priority access to each of said at least three independently addressable memory banks.

4. The compression and decompression engine of claim 1 wherein said compressed or decompressed data provided by said first and second processors is stored in said third of said at least three independently addressable memory banks.

5. The compression and decompression engine of claim 1 wherein said data comprises uncompressed real-time video data stored to a page of system memory, said DMA controller further comprising means for locating said page of real-time video data and transferring said real-time video data to said independently addressable banks of memory for compression and for transferring compressed data from said independently addressable banks of memory to a second page of said system memory in real-time.

6. The compression and decompression engine of claim 5, wherein said central processor is adapted to point said compression/decompression engine to one of a plurality of system memory pages, each of said plurality of system memory pages comprising data for compression or decompression.

7. The compression and decompression engine of claim 5, wherein the rate of compression and decompression is sufficient for real-time compression and decompression of video data.

8. The compression and decompression engine of claim 6, wherein said compression and decompression of real-time video data in accordance with said selected compression or decompression algorithm further comprises means for converting said video data from the spatial domain to the frequency domain for compression and from the frequency domain to the spatial domain for decompression.

9. In a computer system having a central processor and a system memory for storing data, a compression and decompression coprocessor comprising:

a local data memory having sufficient storage space for storing only a portion of data in said system memory;

processor means, associated with said local data memory for processing the data resident in said local data memory in accordance with a compression or decompression algorithm;

means for transferring a portion of said data from said system memory to said local data memory at a rate sufficient to maintain operation of said processor means and for transferring processed data from said local data memory to said system memory; and means associated with said data transferring means for identifying the location of said unprocessed data in said system memory and the location for storing processed data in said system memory.

10. The compression and decompression coprocessor of claim 9 wherein said system memory comprises storage for the equivalent of up to six frames of uncompressed video data captured in real-time.

11. The compression and decompression coprocessor of claim 10 wherein said system memory further comprises dynamically allocable storage for processed data.

12. The compression and decompression coprocessor of claim 10 wherein said central processor selectively operates on said uncompressed video data stored in said system memory prior to the transfer of data from said system memory to said local data memory.

13. In a computer system, a method for controlling data flow during the compression and decompression of image data with a compression engine, said method comprising the steps of:

a) collecting image data in a region of system memory associated with a computer system;

b) configuring a compression engine with a selected compression algorithm;

c) transferring a portion of said image data comprising at least one unit of granularity of data to a first local memory associated with said engine;

d) concurrently compressing the transferred portion of said image data and transferring an additional portion of said image data to a second local memory associated with said engine;

e) storing in a third local memory associated with said engine, the compressed portion of said image data transferred to said first local memory in step c);

f) transferring to said system memory the compressed portion of said image data stored in said third local memory in step e);

g) concurrently compressing the portion of said image data transferred to said second local memory in step f) and transferring an additional portion of said image data to said third local memory;

h) storing in said first local memory, the compressed portion of said image data stored in said second local memory in step f);

i) transferring the compressed portion of said image data stored in said first local memory in step h) to said system memory;

j) concurrently compressing the portion of said image data transferred to said third local memory in step g) and transferring an additional portion of said image data to said first local memory;

k) storing to said second local memory, the compressed portion of said image data stored in said third local memory in step i);

l) transferring the compressed portion of said image data stored in said second local memory in step k) to said system memory; and m) repeating steps c) through l) so that said image data in said system memory is transferred from said system memory, compressed, and transferred back to said system memory.

14. In a computer system, a method for utilizing system memory during the collection of data from a data source for compression or decompression with a compression and decompression engine, said method comprising the steps of:
a) collecting data in a plurality of pages in system memory;
b) transferring a first portion of said data in one of said plurality of pages to a local memory associated with a compression and decompression engine;
c) concurrently transforming said data in accordance with a selected compression or decompression algorithm while transferring a second portion of said data to said local memory; and
d) transferring the data transformed in step c) from said local memory to one of a second plurality of pages in said system memory.

15. The method as recited in claim 14 wherein steps a–d) are performed such that said compression and decompression engine is time-shared by more than one data source.

* * * * *